(12) United States Patent
Shinohara et al.

(10) Patent No.: US 9,607,255 B2
(45) Date of Patent: Mar. 28, 2017

(54) PRINTING DEVICE AND METHOD

(71) Applicant: KYOCERA Document Solutions Inc., Osaka (JP)

(72) Inventors: Yuki Shinohara, Osaka (JP); Hideo Nakahara, El Segundo, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/571,361

(22) Filed: Dec. 16, 2014

(65) Prior Publication Data
US 2016/0171352 A1    Jun. 16, 2016

(51) Int. Cl.
*G06K 15/00*    (2006.01)
*G06F 3/12*    (2006.01)

(52) U.S. Cl.
CPC ............ *G06K 15/408* (2013.01); *G06F 3/12* (2013.01); *G06K 15/402* (2013.01)

(58) Field of Classification Search
CPC ....... G06K 15/408; G06K 15/402; G06F 3/12
See application file for complete search history.

(56) References Cited

U.S. PATENT DOCUMENTS

| | | | | |
|---|---|---|---|---|
| 4,897,799 A | * | 1/1990 | Le Gall | G06F 3/14 345/428 |
| 2009/0225350 A1 | * | 9/2009 | Carney | G06K 15/02 358/1.15 |
| 2015/0371126 A1 | * | 12/2015 | Ota | G06K 15/1806 358/1.14 |

* cited by examiner

*Primary Examiner* — Iriana Cruz
(74) *Attorney, Agent, or Firm* — McDonnell Boehnen Hulbert & Berghoff LLP

(57) ABSTRACT

Example systems and related methods may relate to processing and printing print data in the case of an error. Namely, a printing device may include a communication interface and a controller. The controller includes a processor configured to execute instructions. The instructions include receiving multi-page print data in a first file format via a communication interface. The instructions also include when an error condition is determined during print data processing, responsively transmitting an error message via the communication interface and storing an error page location. The instructions further include receiving the print data in a second file format and determining a remainder portion and a discard portion of the print data in the second file format based on the error page location. The instructions further include processing the remainder portion of the print data in the second file format.

15 Claims, 6 Drawing Sheets

PRINTING DEVICE AND METHOD

BACKGROUND

Printing devices have increased in number and geographic footprint throughout the world and have become increasingly connected to networks. In some cases, printing devices may be able to receive print data in different file formats for redundancy and/or to resolve print errors.

However in response to an error, a printing device may handle print data in the respective file formats in an inefficient manner. Thus, a need exists for an efficient system and method for handling print data in different file formats transmitted in response to a print error.

SUMMARY

In a first aspect, a method is provided. The method includes receiving, at a printing device, print data in a first file format. The print data includes a plurality of pages, and the plurality of pages includes respective pages. The method includes, while the printing device is processing a respective page from the plurality of pages, determining an error condition and responsively transmitting an error message and storing an error page location based on the respective page. The method further includes receiving, at the printing device, the print data in a second file format. The method yet further includes determining a remainder portion and a discard portion of the print data in the second file format based on the error page location. The remainder portion includes at least one respective remainder page. The method additionally includes processing the at least one respective remainder page.

In a second aspect, a method is provided. The method includes receiving, at a printing device, print data in a first file format. The print data in the first file format includes a first plurality of pages. The first plurality of pages includes respective pages. The method also includes storing the print data in the first file format. The method additionally includes, while the printing device is processing a respective page from the first plurality of pages, determining an error condition and responsively transmitting an error message and storing an error page location based on the respective page. The method further includes receiving, at the printing device, the print data in a second file format. The print data in the second file format includes a second plurality of pages. The method yet further includes determining a remainder portion and a discard portion of the second plurality of pages based on the error page location. The remainder portion includes at least one respective remainder page. The method also includes causing an error page to be printed from the remainder portion of the print data in the second file format based on the error page location. The method additionally includes causing at least one further page to be printed from the print data in a first file format. The at least one further page includes at least one previously unprinted page from the first plurality of pages.

In a third aspect, a printing device is provided. The printing device includes a communication interface and a controller. The controller includes a processor configured to execute instructions. The instructions include receiving, via the communication interface, print data in a first file format. The print data includes a plurality of pages and the plurality of pages includes respective pages. The instructions include, while the controller is processing a respective page from the plurality of pages, determining an error condition and responsively transmitting an error message via the communication interface and storing an error page location based on the respective page. The instructions further include receiving, via the communication interface, the print data in a second file format. The instructions yet further include determining a remainder portion and a discard portion of the print data in the second file format based on the error page location. The remainder portion includes at least one respective remainder page. The instructions additionally include processing the at least one respective remainder page.

Other aspects, embodiments, and implementations will become apparent to those of ordinary skill in the art by reading the following detailed description, with reference where appropriate to the accompanying drawings.

DETAILED DESCRIPTION

Figure 1A:
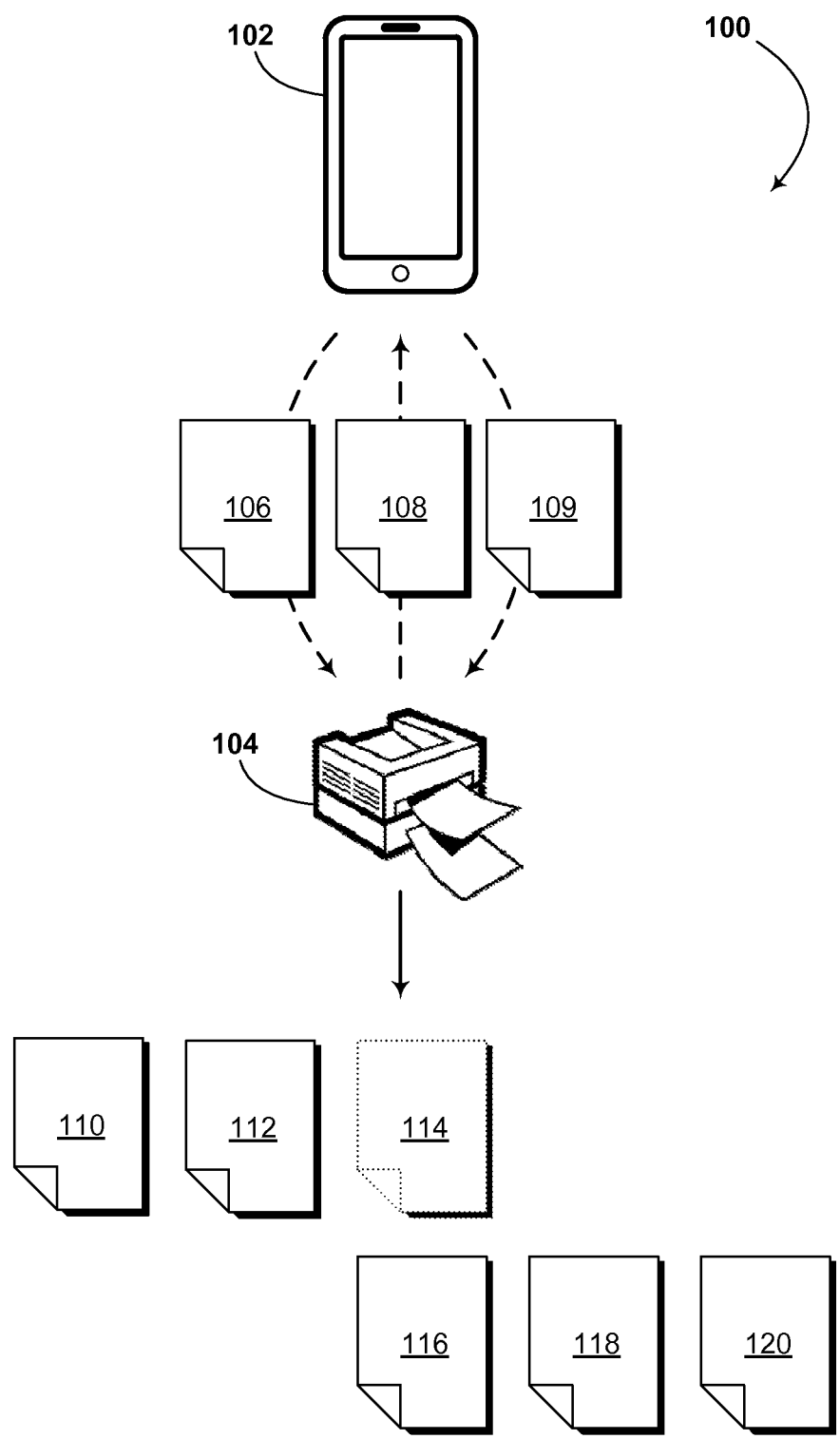
FIG. 1A is a schematic block diagram illustrating a system, according to an example embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Printing devices may accept information about print jobs from a number of different sources. For example, printing devices may be connected via wired or wireless means to computers, networks of computers, the Internet, and/or mobile devices. The mobile devices may include, for example, tablet computers, smart phones, smart watches, or other types of computing devices.

Occasionally, an error may occur while a print job in a first file format is being transmitted to, or processed by, the printing device. For instance, a memory error, a font error, incomplete print job error, or another type of error may occur such that the print job cannot be fully processed and/or printed. In such a case, the printing device may transmit an error message to the device that sent the print job. In response, the device may resend the print job in a different file format.

Previously, the printing device would then print all of the pages associated with the print job in the second file format, even if some pages from the initial print job (sent in the first file format) were printed. Thus, print job errors previously led to a substantial likelihood of wasted time, toner/ink, and paper.

Systems and methods are disclosed herein that provide more efficient handling of print jobs that involve errors and multiple file formats. It should be recognized that the print data may be divided into any number of pages, frames, slides, sections, words, or images. During processing or printing of any such divisions, an error may occur. The described method and system may be applied to such situations.

As an example, a mobile device may be running an instance of a wireless printing client, such as AirPrint. The wireless printing client may be operable to provide print data to a printing device. However, other means of providing print data to a printing device are possible. The mobile device may begin to send multiple pages of print data in a first file format, such as a Portable Document Format (PDF). In an example embodiment, while sending the print data in the first format, the mobile device may lose communication with the printing device. As a result, a portion of the print data in the first file format may not be completely transmitted to the printing device. In response to receiving incomplete print data (e.g. timing out, etc.), the printing device may transmit or otherwise communicate an error to the mobile device.

In response to determining the error condition, the printing device may store an error page location. In the case where the print data was transmitted in a page-by-page, serial manner, the error page location may include, for example, the page number at which the error occurred. The error page location may also include a line number or another way to describe a portion of the print data otherwise unable to be processed and/or printed.

Responsive to receiving the error message, the mobile device may send the print data to the printing device in a second file format, such as Universal Raster Format (URF). However, instead of processing and printing all of the pages from the print data in a second file format, the printing device may discard pages from the print data in the second file format that occur before the error page location. In other words, the printing device may discard pages that may have already been processed and/or printed by the printing device.

The printing device may then process and/or print the remaining, unprinted, portion of the print data in the second file format. If available, the printing device may subsequently optionally process and/or print one or more previously unprinted pages from the print data in the first file format. That is, in some cases, the printing device may process and/or print a portion of the print data from the second file format and then revert back to the print data in the first file format. In some embodiments, the printing device may switch back and forth between print data file formats on several occasions.

II. System Examples

FIG. 1A is a schematic block diagram illustrating a system 100, according to an example embodiment. System 100 includes a mobile device 102. Mobile device 102 may include a smart phone, a laptop, a desktop computer, or another type of computing device configured to provide a print job or print data, either directly or indirectly, to a printing device 104. For example the mobile device 102 may provide print data in a first file format 106. The first file format may include a particular document format, such as PDF, .doc, .eps, .ps, or another file format.

Occasionally, the printing device 104 may determine an error condition related to the transmission, processing, or printing of the print data in the first file format 106. The error condition may include an incomplete print data transmission, a memory error, corrupted print data, or another issue that may require the printing device 104 to acquire further print data to complete the original print job. In an example embodiment, the error condition may occur while the printing device 104 is processing multi-page print data. For instance, as illustrated in FIG. 1A, the error condition may occur due to incomplete print data while the printing device 104 is processing page three of a five page document.

In an example embodiment, the printing device 104 may process and print page 110 and page 112 from the print data in the first file format 106. However, an error may occur while processing and/or printing page 114 from the print data in the first file format 106. Thus, page 114 may be incorrectly printed or not printed at all from the print data in the first file format 106.

In response to determining the error condition, the printing device 104 may store an error page location. That is, the printing device 104 may store the page number or another location reference related to the error condition. In FIG. 1A, the printing device 104 may store "Page Number 3" as the error page location within a five page document.

In response to determining the error condition, the printing device 104 may also transmit an error message 108 to the mobile device 102. The error message 108 may include information about the error condition and information about the print data. For instance, in the above case where incomplete print data caused an error with a multi-page PDF document, the error message 108 may include the particular error condition (INCOMPLETE PRINT DATA) and the particular filename, e.g. "multi_page_document.pdf". The error message 108 may include a different reference for the particular print data related to the multi-page PDF document, e.g. print job reference number, a time stamp, a file checksum, etc. In another embodiment, the printing device 104 need not provide details about the determined error, but may request the print data be resent in a second file format. Other types of error messages are possible. In some embodiments, the print data in the first file format 106 may be discarded upon the printing device 104 determining an error condition.

In response to receiving the error message 108, the mobile device 102 may provide the print data in a second file format 109 to the printing device 104. The print data in a second file format 109 may include print data in an URF file, although other file formats are possible. The print data in the second file format 109 may include print data related to the same multi-page document, but in a different file format than the first file format.

Subsequent to receiving the print data in the second file format 109, the printing device 104 may print pages based on the saved error page location. For instance, as illustrated in FIG. 1A, the printing device 104 may print page 116, page 118, and page 120, which may represent page three through page five in the multi-page document.

Figure 1B:
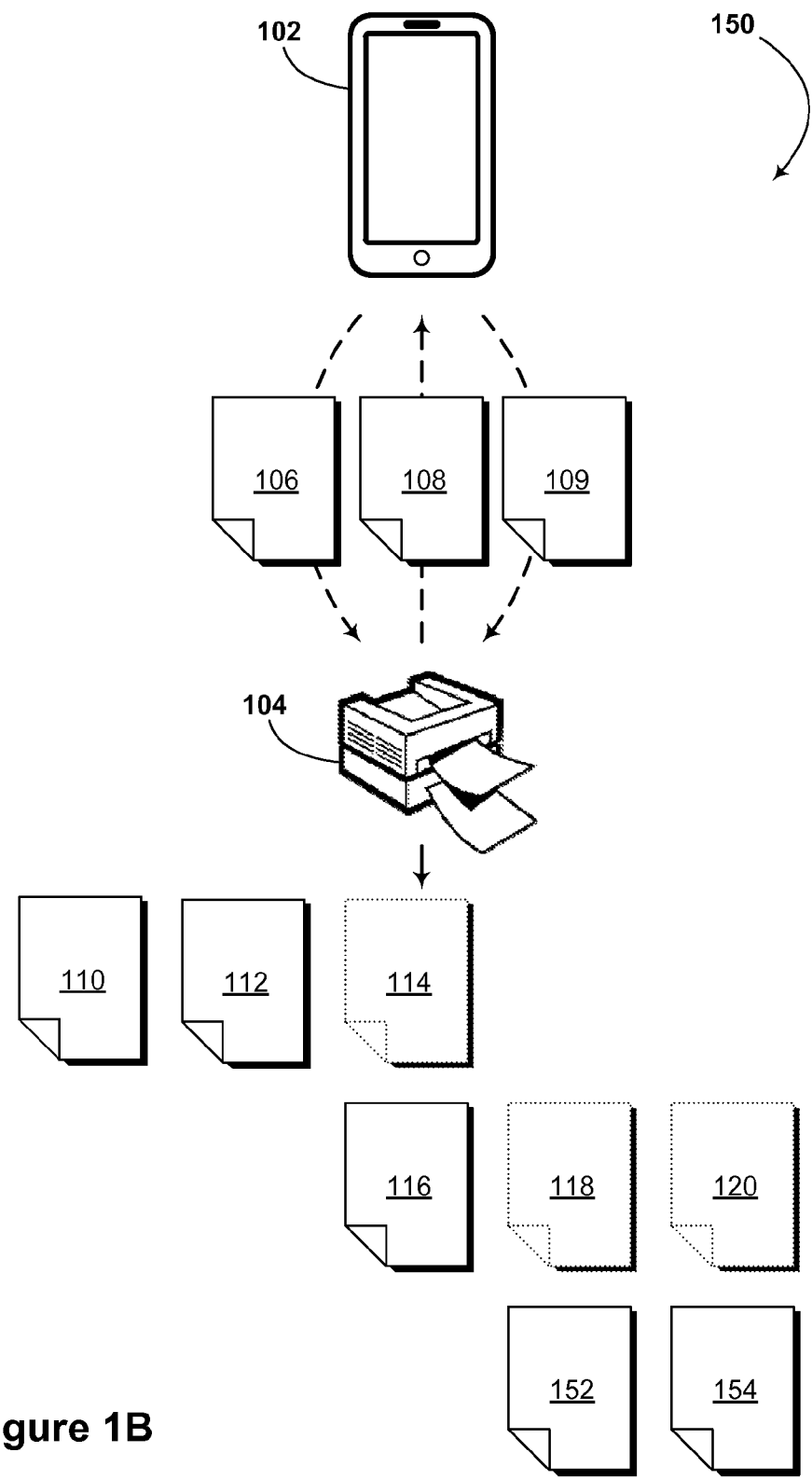
FIG. 1B is a schematic block diagram illustrating a system, according to an example embodiment.

FIG. 1B is a schematic block diagram illustrating a system 150, according to an example embodiment. System 150 may be similar or identical to system 100, as described in reference to FIG. 1A, in some respects. However, page processing and/or printing may vary from that illustrated in FIG. 1A. Specifically, the printing device 104 may print page 110 and page 112 normally, and then determine an error condition while printing/processing page 114, as described above. The printing device 104 may retain the print data in the first file format 106, store an error page location, and transmit an error message to the mobile device 102. However, as illustrated in FIG. 1B, the printing device 104 may print page 116 and discard page 118 and page 120 from the print data in the second file format 109. The printing device 104 may print page 152 and page 154 from the print data in the first file format 106. In other words, upon determining an error condition while processing and/or printing the print data in the first format 106, the printing device 104 need not print all of the remaining pages of a multi-page document from the print data in the second file format 109. Rather, the printing device 104 may revert back to processing and/or printing the previously unprinted pages from the print data in the first format 106 once an error page has been printed.

Figure 2:
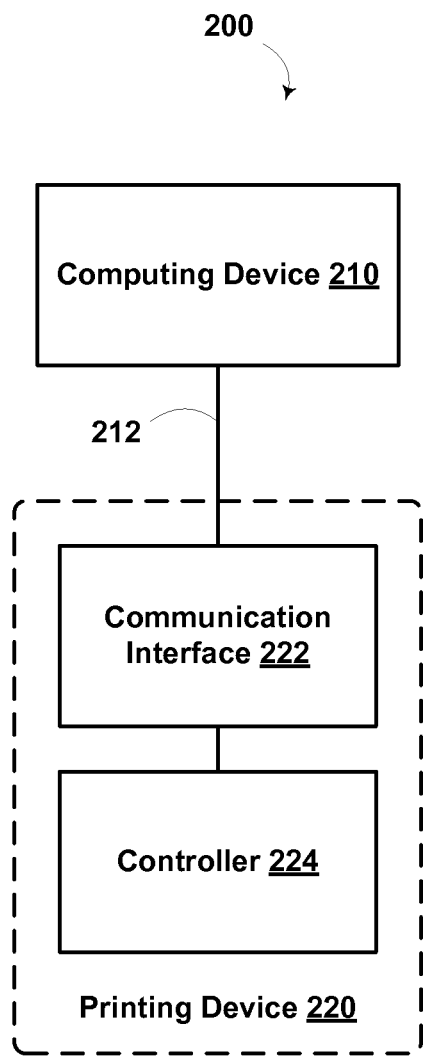
FIG. 2 is a schematic block diagram illustrating a system, according to an example embodiment.

FIG. 2 is a schematic block diagram illustrating a system 200, according to an example embodiment. The elements of system 200 may include similar or identical elements as in system 100 and system 150 as illustrated and described in reference to FIGS. 1A and 1B. System 200 may include a computing device 210 communicatively linked to a communication interface 222 of a printing device 220. The printing device 220 may include a controller 224. The controller 224 may include a computer with a memory and at least one processor. Additionally or alternatively, the controller 224 may include a plurality of computers, such as a cloud computing system and/or a computer network.

The communication interface 222 may be configured to connect with the computing device 210 via a wireless or wired communication link 212. The communication link 212 may be established in a variety of ways. For example, the communication link 212 may be established via an IEEE 802.11 a, b, g, or n (Wi-Fi) network. Alternatively or additionally, the communication link 212 may be established via cellular data service, radio communications, near-field communications (NFC), infrared communications, RFID, ZIGBEE, BLUETOOTH, or another type of communication link.

The at least one processor of the controller 224 may be configured to execute instructions. The instructions include receiving, via the communication interface 222, print data in a first file format. For instance, the print data may include a multi-page document in a PDF file format. The print data includes a plurality of pages, each of which may be described as a respective page. Generally, the plurality of pages may include any number of pages or another type of division of the print data.

The instructions include, while the controller 224 is processing a respective page from the plurality of pages, determining an error condition and responsively transmitting an error message via the communication interface 222 and storing an error page location based on the respective page. Processing the respective pages may include converting the respective pages into a bitmap format. As described above, the determined error condition may include a data error, a memory error, a processing error, or another type of error that causes the printing device 220 to be unable to process and/or print a respective page. Furthermore, the respective page related to the determined error condition may be stored as an error page location. In other words, the error page location may relate to a particular page during which the error was determined.

The instructions also include receiving, via the communication interface 222, the print data in a second file format. The print data may include the same or substantially similar multi-page document but in a different file format. For example, the print data in the second file format may include the multi-page document being an URF file. Other file formats are possible.

The instructions additionally include determining a remainder portion and a discard portion of the print data in the second file format based on the error page location. The remainder portion includes at least one respective remainder page. In other words, the controller 224 may determine a portion of the print data in the second format that should be retained (the remainder portion), and a portion that may be discarded (the discard portion). The determination of these portions may be based on the error page location. For example, if the error page location is page three, the remainder portion may be determined to be pages three to five of a five-page document. Accordingly, the discard portion may be determined to be pages one to two.

The instructions may further include processing the at least one respective remainder page. In an example embodiment, after determining the remainder portion, the controller 224 may process and print the remaining pages from the remainder portion of the print data in the second file format.

Some embodiments include processing and/or printing an error page based on the error page location within the print data in the second file format and then processing and/or printing any remaining unprinted pages from the print data in the first file format.

In some embodiments, the discard portion may be skipped, ignored, deleted, or otherwise removed from memory. In yet other embodiments, the discard portion may include the print data in the second file format except for print data in the second file format corresponding to an error page based on the error page location. That is, the controller may discard all of the print data in the second file format with the exception of the particular error page location.

In an example embodiment, while the controller is processing a respective page from the plurality of pages, the controller may determine a proper condition and responsively print the respective page. That is, the controller may print the pages in response to determining a respective page has been properly processed.

The controller may also be configured to execute instructions such as causing an error page to be printed from the remainder portion of the print data in the second file format based on the error page location and causing at least one further page to be printed from the print data in a first file format. The at least one further page includes at least one previously unprinted page from the plurality of pages.

III. Method Examples

Figure 3A:
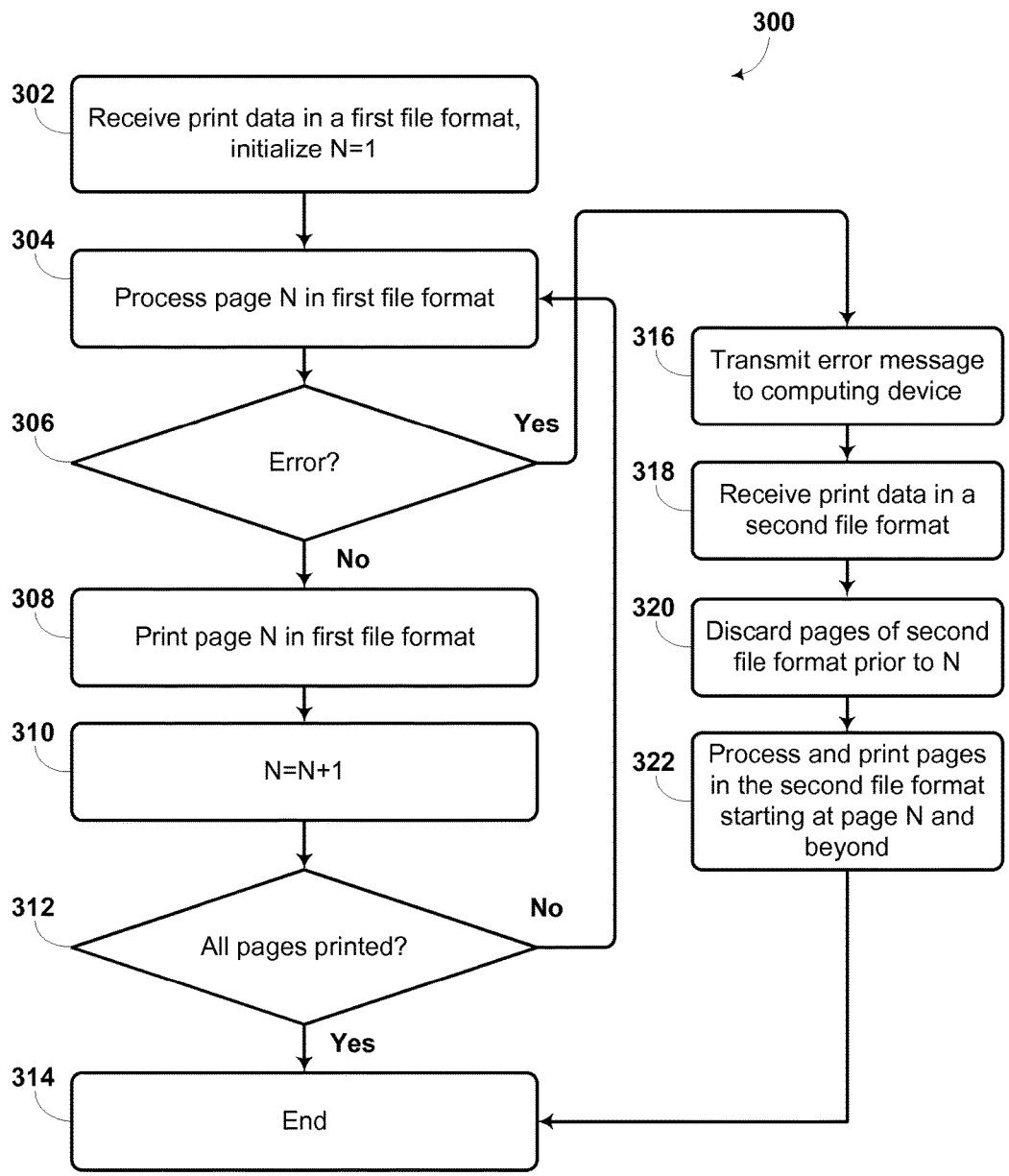
FIG. 3A is a flow diagram illustrating a method, according to an example embodiment.
Figure 3B:
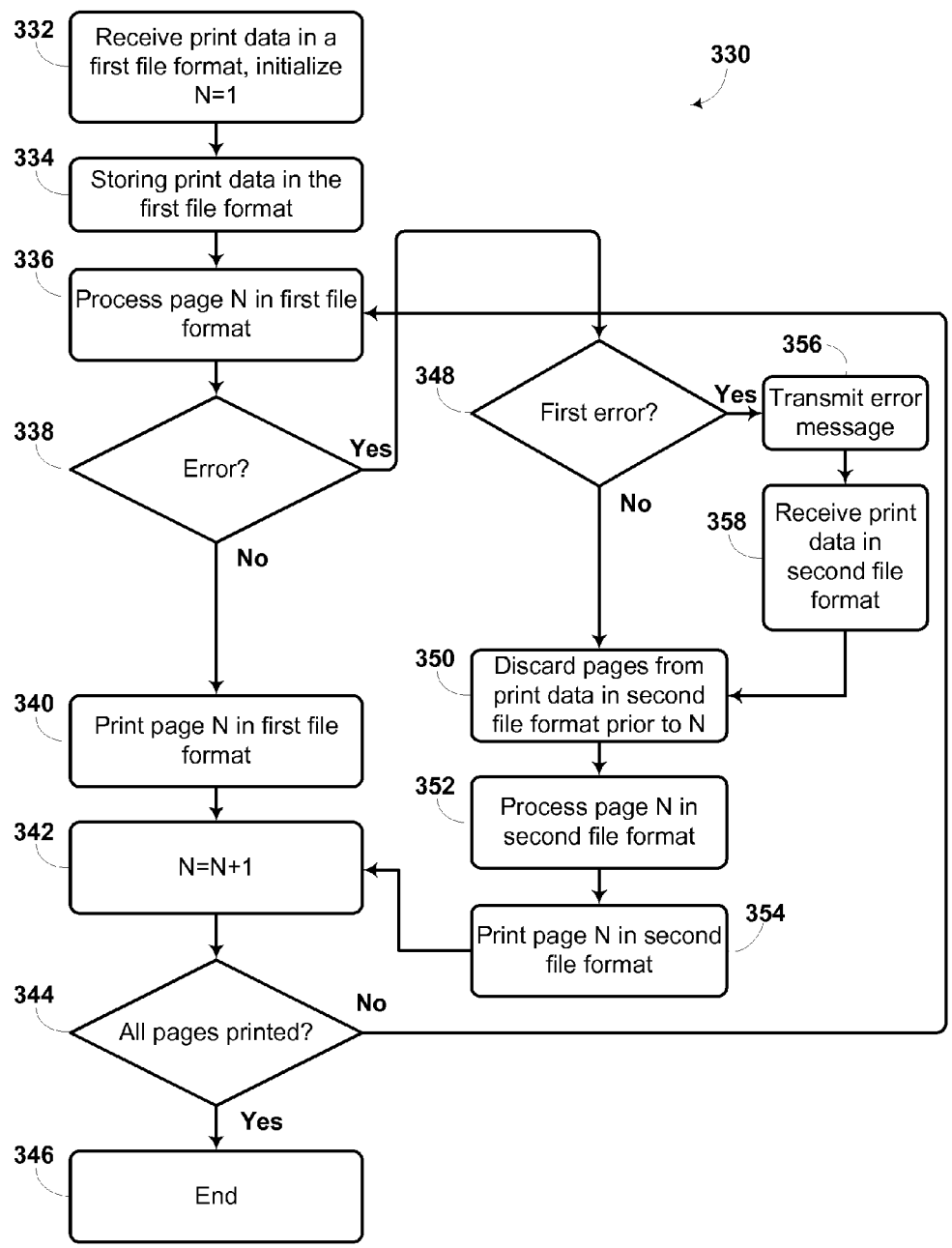
FIG. 3B is a flow diagram illustrating a method, according to an example embodiment.
Figure 3C:
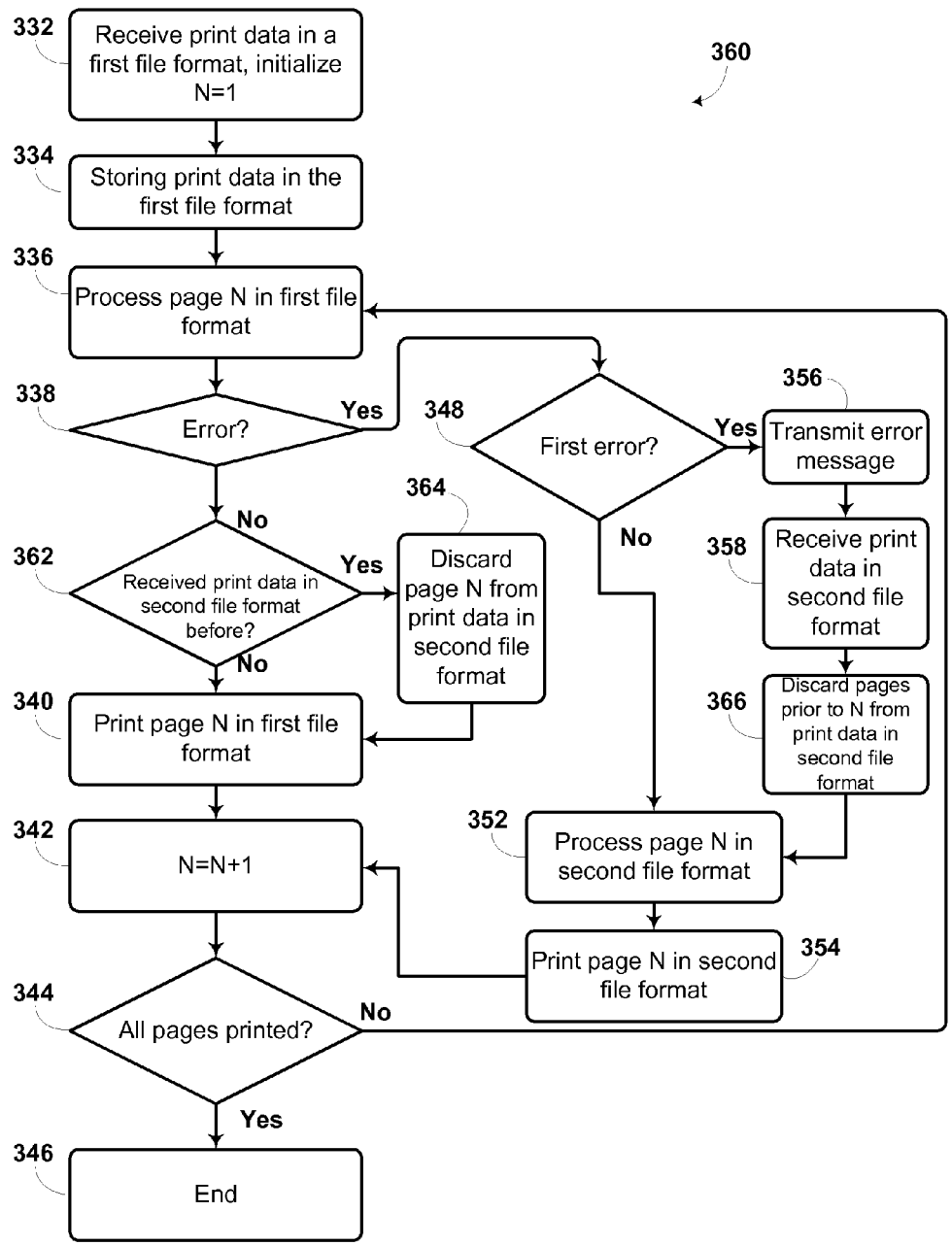
FIG. 3C is a flow diagram illustrating a method, according to an example embodiment.

FIGS. 3A-C illustrate methods, according to one or more embodiments. The methods include blocks that may be carried out in an order other than that illustrated. Furthermore, various blocks may be added to or subtracted from the described methods within the intended scope of this disclosure. The methods may correspond to steps that may be carried out using some or all of the elements of system 100, system 150, and/or system 200, as illustrated and described in reference to FIGS. 1A-B and FIG. 2.

FIG. 3A is a flow diagram illustrating a method 300, according to an example embodiment. Block 302 may include receiving print data in a first file format and initializing a counter to N=1. The print data may be received by a printing device, such as printing device 220 as illustrated and described in reference to FIG. 2. The print data may be received in a document file format such as PDF, .doc, .xls, .eps, .ps, .pcl, .jpg, .bmp, .gif, .png, .tiff, or another file format. The file format may include a bitmap or a vector type image. The counter may be initialized at a different number than 1, as long as a page or location reference is stored and/or maintained.

Block 304 includes processing page N in the first file format. As an example, the print data may be received as a multi-page PDF document. Thus, according to block 304, the printing device may process the PDF document page N. Processing may include receiving print data and/or converting the PDF print data into a printable format. Processing may further include spooling the print data into a print job queue for printing via the printing device. Other types of processing are possible.

Block 306 includes determining whether an error condition exists. An error condition may be any condition which causes the printing device to be unable to process and/or print at least a portion of the print data. For example, an error condition may arise when a communication link is disconnected before all of the print data in the first format is transmitted by the sending device (e.g. a mobile device) and/or received by the printing device. Other types of error conditions may include memory errors, corrupted print data, etc. The error condition may be determined by a controller, such as controller 224 illustrated and described in reference to FIG. 2.

Block 308 includes in the case when there is no error condition, print page N in the first file format. In an example embodiment, page N is printed from the PDF print data.

Block 310 includes incrementing the counter such that N=N+1. Block 312 includes checking whether all pages of the document have been printed. In some embodiments, the controller may determine that N pages have actually been printed. In other embodiments, the controller may determine that the page X of a document including X pages has been printed.

If all pages have been printed, block 314 includes ending the method.

Block 316 includes transmitting an error message to a computing device in response to the controller determining an error condition. The error message may include a request to resend the print data in a second file format. The method 300 may include storing an error page location based on the respective page being processed during the error, e.g. page N. Block 318 includes receiving the print data in a second file format. In some embodiments, the second file format may include an URF file.

Block 320 includes discarding pages of the print data in the second file format prior to page N. Specifically, a controller may determine a remainder portion and a discard portion of the print data in the second file format. The determination may be made based on the error page location. For example, if the error occurred on page N, the controller may determine the discard portion of the multi-page document to be all pages occurring before page N. Block 322 includes processing and printing pages in the second file format starting at page N and continuing to the end of the document. In some embodiments, the printing of a respective page may occur in response to determining a proper condition during processing of the respective page. The proper condition may correspond to a proper checksum, lack of error condition, etc. After all pages have been printed, the method may end with block 314.

FIG. 3B is a flow diagram illustrating a method 330, according to an example embodiment. Block 332 may include receiving print data in a first file format and initializing a page counter, N. In an example embodiment, printing device 220 may receive the print data in the first format from mobile device 210, as illustrated and described in reference to FIG. 2. Further, the first file format may include a multi-page PDF document.

Block 334 includes storing the print data in the first file format. For example, the print data may include a multi-page document. In an example embodiment, the print data may be stored in a file storage associated with the printing device 220. For example, the printing device 220 may include a memory in which the print data may be stored.

Block 336 includes processing page N in the first file format. Processing pages may include forming bitmap images for the respective page from the print data. Other types of processing may be performed.

Block 338 includes determining whether an error condition has occurred. As described above, an error condition may include, but should not be limited to, incomplete print data, corrupted print data, or another type of error that causes the printing device to not be able to print all pages of the multi-page document.

If an error condition is determined, the method proceeds to block 348, which includes a determination of whether the error condition is the first error related to the present print data. If so, an error message may be transmitted as shown in block 356. The error message may include a request for the print data to be resent in a second file format. Responsively, the mobile device 210, or another sending device, may provide the print data in the second file format as provided in block 358. The print data in the second file format may be created by the mobile device 210. Alternatively or additionally, the print data in the second file format may be created and/or provided by another server or a cloud server device. In an example embodiment, the mobile device 210 may not support the second file format. In such a scenario, another server device may be configured to support the second file format and create the print data in the second format. The method may continue to block 350.

In the case where the determination in block 348 is false (e.g. not the first error associated with this print data), block 350 provides discarding pages prior to N from the print data in the second file format. That is, pages from the second file format that precede the error condition are not needed and may be ignored, deleted, or otherwise discarded.

Block 352 includes processing page N of the print data in the second file format. Again, processing page N may include converting the print data for that respective page into a bitmap image. Other forms of processing are possible. After successful processing, page N may be printed from the print data in the second format as shown in block 354.

Block 340 includes, in the case where no error condition is determined, printing page N in the first file format. Block 342 includes incrementing the page counter such that N=N+1.

Block 344 includes determining whether all pages have been printed. If not, the method returns to block 336 to process page N. If all pages have been printed, the method may end with block 346.

FIG. 3C is a flow diagram illustrating a method 360, according to an example embodiment. Method 360 may be similar or identical in some respects to method 330, as illustrated and described in reference to FIG. 3B. However, in the case where no error condition is determined while processing page N, block 362 may include a determination as to whether print data in the second file format has previously been received by the printing device. If so, block 364 includes discarding page N from the print data in the second file format. That is, print data in the second file format may have been previously received and stored. Due to the fact that no error was determined while processing the print data for page N in the first file format, the corresponding print data in the second file format is not needed. Thus, page N of the second file format may be discarded.

Method 360 provides optionally storing the print data in either or both of the first file format and the second file format. As described above, method 360 may include the controller determining a discard portion and a remainder portion of the print data in the second file format. The method optionally provides printing an error page from the remainder portion of the print data in the second file format based on the error page location and printing at least one further page from the print data in the first file format. The at least one further page may include at least one previously unprinted page from the plurality of pages.

In some embodiments, the discard portion may be determined to include all of the print data in the second file format except for the print data in the second file format corresponding to the error page. As described above, the error page may be based on the error page location, e.g. error page=page N.

Method 360 may further include block 366 which provides that pages prior to N be discarded in scenarios when a first error is determined in block 348.

While various examples and embodiments have been disclosed, other examples and embodiments will be apparent to those skilled in the art. The various disclosed examples and embodiments are for purposes of illustration and are not intended to be limiting, with the true scope and spirit being indicated by the following claims.

What is claimed is:

1. A method comprising:
receiving, at a printing device, print data in a first file format, wherein the print data comprises a plurality of pages, and wherein the plurality of pages comprises respective pages;
while the printing device is processing a respective page from the plurality of pages, determining an error condition and responsively transmitting an error message and storing an error page location based on the respective page;
receiving, at the printing device, the print data in a second file format, wherein the first file format and the second file format are different from each other;
determining a remainder portion and a discard portion of the print data in the second file format based on the error page location, wherein the remainder portion comprises at least one respective remainder page, wherein the at least one respective remainder page comprises the print data in the second file format that corresponds to an error page, wherein the discard portion comprises the print data in the second file format that corresponds to one or more pages except for the error page; and
processing the at least one respective remainder page, wherein processing the at least one respective remainder page comprises processing the print data in the second file format that corresponds to the error page and printing the error page.

2. The method of claim 1 further comprising while the printing device is processing a respective page from the plurality of pages, determining a proper condition and responsively printing the respective page.

3. The method of claim 1, further comprising discarding the discard portion of the print data in the second file format.

4. The method of claim 1, further comprising storing the print data in the first file format.

5. The method of claim 1, further comprising storing the print data in the second file format.

6. The method of claim 1, further comprising:
printing an error page from the remainder portion of the print data in the second file format based on the error page location; and
printing at least one further page from the print data in a first file format, wherein the at least one further page comprises at least one previously unprinted page from the plurality of pages.

7. The method of claim 1 wherein processing the respective pages comprises converting the respective pages into a bitmap format.

8. The method of claim 1 wherein the first file format comprises a portable document format (PDF).

9. The method of claim 1 wherein the second file format comprises a universal raster format (URF).

10. A printing device comprising:
a communication interface; and
a controller, wherein the controller comprises a processor configured to execute instructions, the instructions comprising:
receiving, via the communication interface, print data in a first file format, wherein the print data comprises a plurality of pages, and wherein the plurality of pages comprises respective pages;
while the controller is processing a respective page from the plurality of pages, determining an error condition and responsively transmitting an error message via the communication interface and storing an error page location based on the respective page;
receiving, via the communication interface, the print data in a second file format, wherein the first file format and the second file format are different from each other;
determining a remainder portion and a discard portion of the print data in the second file format based on the error page location, wherein the remainder portion comprises at least one respective remainder page, wherein the at least one respective remainder page comprises the print data in the second file format that corresponds to an error page, wherein the discard portion comprises the print data in the second file format that corresponds to one or more pages except for the error page; and
processing the at least one respective remainder page, wherein processing the at least one respective remainder page comprises processing the print data in the second file format that corresponds to the error page and printing the error page.

11. The printing device of claim 10 further comprising while the controller is processing a respective page from the plurality of pages, determining a proper condition and responsively printing the respective page.

12. The printing device of claim 10 wherein the instructions further comprise:
causing an error page to be printed from the remainder portion of the print data in the second file format based on the error page location; and
causing at least one further page to be printed from the print data in a first file format, wherein the at least one further page comprises at least one previously unprinted page from the plurality of pages.

13. The printing device of claim 10 wherein processing the respective pages comprises converting the respective pages into a bitmap format.

14. The printing device of claim 10 wherein the first file format comprises a portable document format (PDF).

15. The printing device of claim 10 wherein the second file format comprises a universal raster format (URF).

* * * * *